United States Patent
Guan et al.

(10) Patent No.: US 7,280,837 B2
(45) Date of Patent: Oct. 9, 2007

(54) METHOD OF INTERPOLATING CHANNEL QUALITY

(75) Inventors: Wei Guan, Shanghai (CN); Zhigang Luo, Shanghai (CN)

(73) Assignee: Alcatel, Paris (FR)

( * ) Notice: Subject to any disclaimer, the term of this patent is extended or adjusted under 35 U.S.C. 154(b) by 43 days.

(21) Appl. No.: 11/214,874

(22) Filed: Aug. 31, 2005

(65) Prior Publication Data

US 2006/0046738 A1 Mar. 2, 2006

(30) Foreign Application Priority Data

Sep. 2, 2004 (CN) .................... 2004 1 0054238

(51) Int. Cl.
*H04Q 7/20* (2006.01)
*H04Q 7/34* (2006.01)

(52) U.S. Cl. .................. 455/452.2; 455/452.1; 455/67.11; 455/509; 455/522.1; 455/69; 455/423; 455/422.1

(58) Field of Classification Search ......... 455/452.1, 455/452.2, 69, 522, 422.1, 403, 426.1, 426.2, 455/436, 442, 67.11, 67.12, 67.13, 68, 500, 455/517, 423, 424, 425, 509, 550.1, 434, 455/511, 515

See application file for complete search history.

(56) References Cited

U.S. PATENT DOCUMENTS

| | | | |
|---|---|---|---|
| 6,269,239 B1 | 7/2001 | Hashem et al. | |
| 6,463,296 B1 | 10/2002 | Esmailzadeh et al. | |
| 2002/0115461 A1 | 8/2002 | Shiraki et al. | |
| 2003/0161285 A1 | 8/2003 | Tiedemann et al. | |
| 2004/0142692 A1* | 7/2004 | Schwarz et al. ........... | 455/442 |
| 2005/0245278 A1* | 11/2005 | Vannithamby et al. ...... | 455/522 |
| 2006/0135171 A1* | 6/2006 | Roy et al. .................. | 455/450 |

FOREIGN PATENT DOCUMENTS

| | | |
|---|---|---|
| EP | 1107482 | 6/2001 |
| EP | 1408635 | 4/2004 |
| WO | 01/31824 | 5/2001 |

OTHER PUBLICATIONS

Sony Corporation: "Delay on Control Information for DS-DSCH" TSG-RAN Working Group 1 Meeting #17, Nov. 21, 2000-Nov. 24, 2000; Stockholm, Sweden; XP002428074.

* cited by examiner

*Primary Examiner*—Keith Ferguson
(74) *Attorney, Agent, or Firm*—Sughrue Mion Pllc.

(57) ABSTRACT

A method of interpolating channel quality in a wireless communication system, the wireless communication system including a node B and a user equipment, the user equipment periodically reporting the channel quality to the node B, the method including the steps of: estimating, by node B, the channel quality of the current period based on the channel quality of the preceding period reported by the user equipment; after obtaining the channel quality of the current period reported by the user equipment, computing, by node B, the difference between the estimated channel quality of the current period and the channel quality of the current period reported by the user equipment; and obtaining, by node B, a confidence parameter according to the difference, and interpolating the channel quality reported by the user equipment based on the confidence parameter. Node B can acquire reliable downlink channel quality information in real time, and thus schedule the users within the cell more reasonably, select the data transport format and control the power more accurately. Thus, the quality of service of the users and the utilization efficiency of the system resources are improved.

7 Claims, 2 Drawing Sheets

METHOD OF INTERPOLATING CHANNEL QUALITY

CROSS-REFERENCE TO RELATED APPLICATION(S)

This application is based on the Chinese Patent Application No. 200410054238.9 filed on Sep. 2, 2004, the disclosure of which is hereby incorporated by reference thereto in its entirety, and the priority of which is hereby claimed under 35 U.S.C. §119.

FIELD OF THE INVENTION

The present invention relates to wireless communication systems, and more particularly, to a method of interpolating channel quality in wireless communication systems.

BACKGROUND OF THE INVENTION

As to High-Speed Downlink Packet Access (HSDPA), user equipment (UE) reports the measured channel quality of High-Speed Downlink Shared Channel (HS-PDSCH) to the Media Access Control-high speed (MAC-hs) functional entity of node B. According to the reported channel quality, the MAC-hs functional entity selects the next data transmission format (e.g. the size of data blocks, modulation format, the number of HS-PDSCH channel codes, etc.) and performs the downlink channel power control.

The period the UE reporting the channel quality is determined by Radio Network Controller (RNC). In general, the period is 1-80 HSDPA Transmission Time Intervals (TTI), one HSDPA TTI is 2 ms. However, due to transmitting and processing delay, the channel quality the MAC-hs receives is not the real reflection of the current downlink channel quality, seeing as the downlink channel often undergoes changes caused by fading, hindering, interfering and the like. In particular, when the period for reporting the channel quality is relatively long, if the MAC-hs directly employs the channel quality reported by the UE to perform user scheduling, data transmission format selecting and power controlling, then resources of the system cannot be utilized fully and effectively.

In order to enable the MAC-hs to track channel changes in real time to implement link adaptation better, it can be considered using Fast Power Control (TPC) information to interpolate channel quality, since the uplink Dedicated Control Channel (DPCCH) uploads the TPC information per time slot. Generally, the interval between time slots is ⅔ ms, and the TPC information usually reflects the changing trend of adjacent time slots of downlink channel.

In some cases (for instance, the bad uplink Dedicated Control Channel quality results in TPC decoding errors; the fact that inner loop power control fails to keep the track when UE is moving at a high speed, leads to errors in TPC; and UE is in a soft-handoff state), however, the TPC information is not correlated with the change trends of the downlink channel HS-PDSCH. If the interpolating using TPC information is still employed to obtain channel quality, then negative effects will be produced, let alone benefits.

The document "TSG R1#17 (00) 1378" disclosed during the meeting "TSG-RAN Working Group 1 meeting #17, Stockholm, Sweden, Nov. 21-24, 2000" proposed a method of obtaining real-time channel quality by interpolating using fast power control information TPC and downlink channel signal noise rate SNR reported by UE, which is incorporated into the present invention by reference.

However, the document "TSG R1 # 19 (01) 0231" disclosed during the meeting "TSG-RAN Working Group 1 meeting #19, Las Vegas, Nev., USA, Feb. 27-Mar. 2, 2001" pointed out that the aforesaid method of obtaining real-time channel quality by interpolating using fast power control information TPC and downlink channel SNR reported by UE cannot achieve good results during soft handoff and hence, suggested stopping interpolating at that time. Since only RNC knows whether the UE is in the soft-handoff state, whether or not to interpolate channel quality rests upon the RNC's notification. This leads to signaling overhead between node B and RNC, and needs to modify the existing protocols. The aforesaid document is incorporated into the present invention by reference.

Therefore there is a need for a method capable of carrying out reliable channel quality interpolating.

SUMMARY OF THE INVENTION

In order to address the above-mentioned problem, the present invention proposes a method of interpolating channel quality in a wireless communication system, said wireless communication system comprising a node B and a user equipment, said user equipment periodically reporting the channel quality to said node B, said method comprising the steps of: estimating, by said node B, the channel quality of the current period based on the channel quality of the preceding period reported by said user equipment; after obtaining the channel quality of the current period reported by said user equipment, computing, by said node B, the difference between the estimated channel quality of the current period and the channel quality of the current period reported by said user equipment; and obtaining, by said node B, a confidence parameter according to said difference, and interpolating the channel quality reported by said user equipment based on said confidence parameter.

Preferably, said node B estimates the channel quality of the current period and interpolates the channel quality reported by said user equipment using fast power control information uploaded on uplink dedicated control channel.

Preferably, said method further comprising the step of: performing weight processing on said difference.

Preferably, said wireless communication system further comprises a RNC, said RNC determining the period for reporting the channel quality and notifying the period to said node B and said user equipment.

Preferably, said RNC further notifying a power control step size to said node B.

Preferably, said channel quality reporting period includes multiple transmission time intervals.

According to the present invention, the node B can acquire reliable downlink channel quality information at real time, and thus schedule the users within the cell more reasonably, select the data transport format and control the power more accurately. Thus, the quality of service of the users and the utilization efficiency of the system resources are improved.

BRIEF DESCRIPTION ON THE DRAWINGS

DESCRIPTION OF THE PREFERRED EMBODIMENTS

Hereinafter, the present invention will be described in detail with reference to the accompanying drawings.

For the purpose of convenience, here, description is made by taking HSDPA for example. However, the present invention is not limited to HSDPA, like systems that adopt channel quality reports and fast power control can also implement the present invention.

Figure 1:
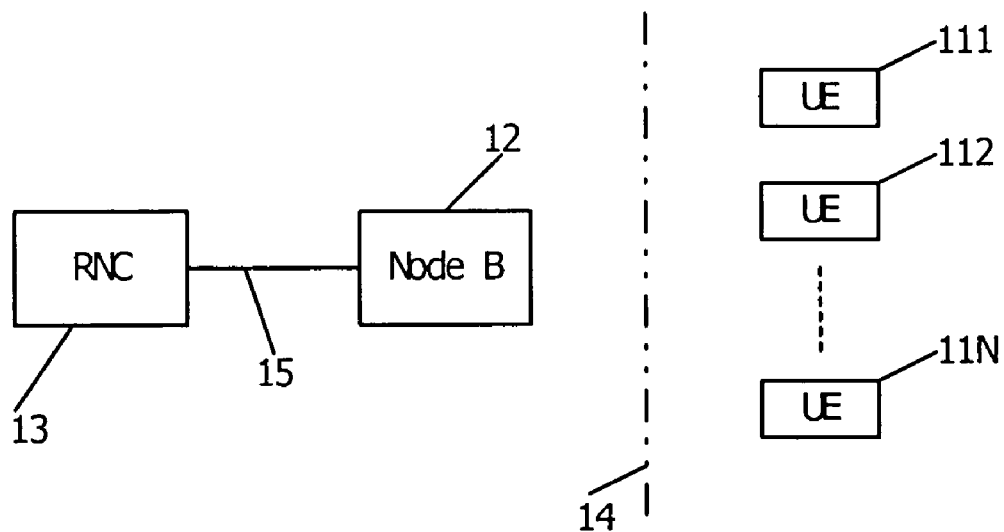
FIG. 1 shows a schematic diagram of a wireless communication network according to the present invention.

FIG. 1 shows a schematic diagram of a wireless communication network according to the present invention. It comprises user equipments 111, 112, ..., 11N, a node B 12 and a RNC 13. Said user equipments 111, 112, ..., 11N communicates via an air interface 14 with said node B 12, and said node B 12 communicates via a line 15 with said RNC 13.

Figure 2:
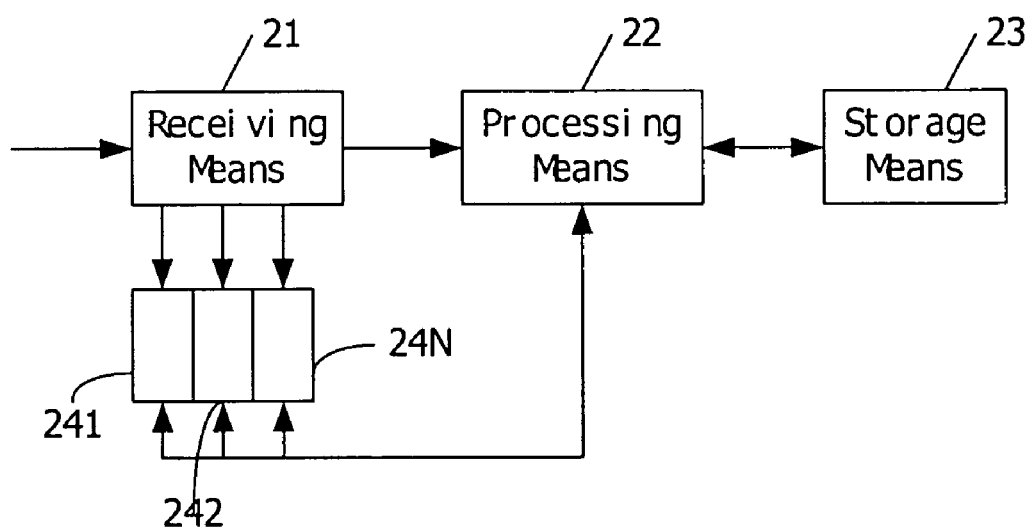
FIG. 2 shows a schematic diagram of node B according to the present invention.

FIG. 2 shows a schematic diagram of node B according to the present invention. As shown in FIG. 2, said node B comprises: receiving means 21, for receiving corresponding information from said user equipments 111, 112, ..., 11N; processing means 22, for interpolating the channel quality; storage means 23, for storing the corresponding information used for interpolating the channel quality; and accumulating counters 241, 242, ..., 24N, in which said accumulating counter 241 corresponds to the first user equipment 111, said accumulating counter 242 corresponds to the second user equipment 112, ..., and said accumulating counter 24N corresponds to the Nth user equipment 11N.

As described above, said RNC 13 determines the period said user equipments 111, 112, ..., 11N report the channel quality and notifies the period to said user equipments 111, 112, ..., 11N and said node B. In general, the period is 1-80 HSDPA TTIs, one HSDPA TTI is 2 ms. Hereinafter, the channel quality is represented as CQI with a view of convenience. During the reporting period of each CQI, said receiving means 21 of said node B receives from each of said user equipments 111, 112, ..., 11N a new CQI respectively, which is represented as CQI_report for the purpose of convenience. During one CQI reporting period, the CQI can be reported for 1-4 times. After said receiving means 21 of said node B 12 receives the CQI, the CQI is stored on said storage means 23 via said processing means 22.

According to one embodiment of the present invention, during the corresponding CQI period, after a user equipment reports the first CQI to said node B, said receiving means 21 of said node B sends the received corresponding TPC to the accumulating counter corresponding to said user equipment for recording all the TPC. For the purpose of convenience, all the TPC information is represented as TPC_Count. Then, said processing means 22 stores the TPC_Count on said storage means 23.

According to one embodiment of the present invention, the TPC is recorded once per time slot. When a new CQI period starts, said processing means 22 resets the accumulating counter. Each accumulating counter can be increasing and decreasing, when TPC=1, the accumulating counter is increased by one, and when TPC=0, the accumulating counter is decreased by one.

Figure 3:
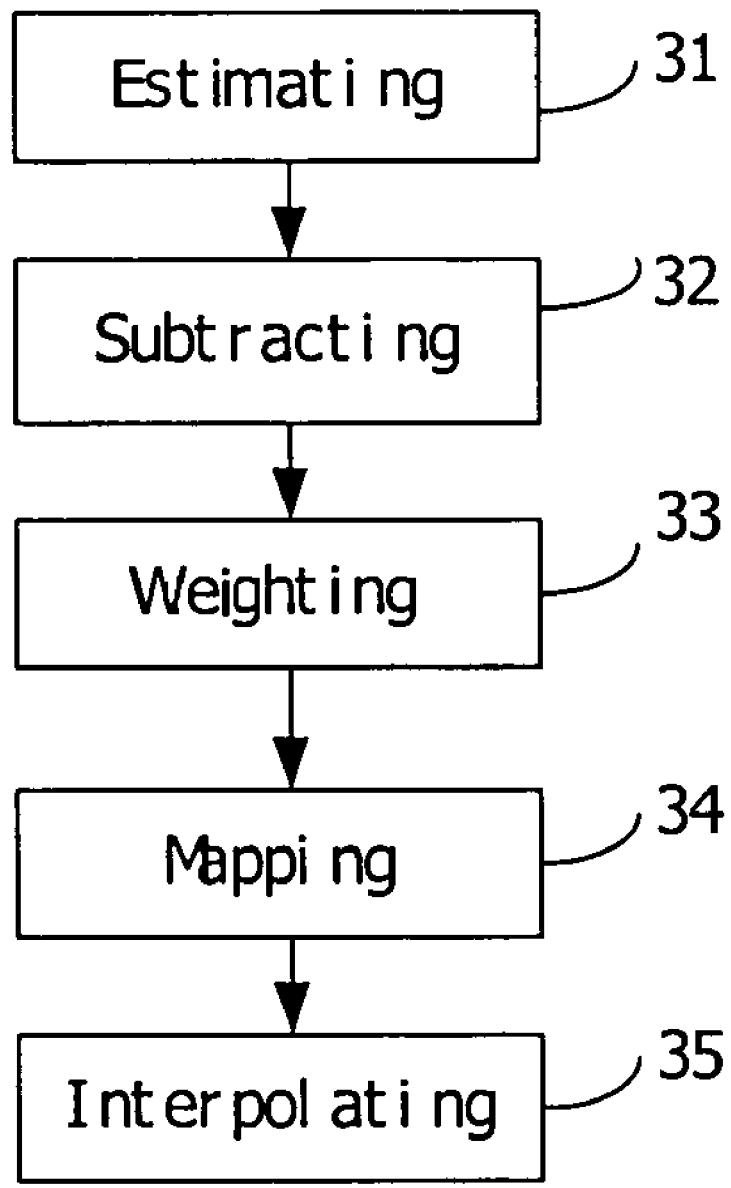
FIG. 3 shows a flow chart of an embodiment according to the present invention.

FIG. 3 shows a flow chart of an embodiment according to the present invention.

First, in step 31, said processing means 22 computes an estimated CQI, or CQI', based on the CQI_report and the TPC_Count stored on said storage means 23:

$$CQI'(n)=CQI\_report(n-1)+Power\_Control\_stepsize \times TPC\_Count(n-1)$$

Here, n represents the nth period of CQI; CQI_report(n-1) represents the CQI of the (n-1)th period reported by a user equipment; Power_Control_stepsize represents the power control step size, i.e. the maximum range of each power adjustment, which is determined by the RNC and notified to said node B; and TPC_Count(n-1) represents the accumulation of all the TPCs within the (n-1)th CQI period.

Upon receipt of the new CQI reported by a user equipment, the flow goes to step 32.

In step 32, said processing means 22 computes the difference $\Delta(n)$ between the estimated CQI using the above expression and the reported CQI:

$$\Delta(n)=CQI\_report(n)-CQI'(n)$$

wherein, $\Delta(n)$ represents the difference between the reported CQI and the estimated CQI, and CQI_report(n) represents the CQI of the nth period reported by a user equipment.

Moreover, said processing means 22 stores the difference on said storage means 23.

Next, the flow goes to step 33. In step 33, said processing means 22 performs weight processing on $\Delta(n)$ by using the differences $\Delta(n-1)$, $\Delta(n-2)$, $\Delta(n-3)$, ... between the CQIs reported and the CQI estimated of the (n-1)th, (n-2)th, (n-3)th, ... periods, stored on said storage means 23, to obtain the weighted $\Delta(n)$, namely $\Delta'(n)$. Where $\Delta(n-1) =CQI\_report(n-1)-CQI'(n-1)$, $\Delta(n-2)=CQI\_report(n-2)-CQI'(n-2)$, and the rest is reasoned out by analogy.

The weight processing on $\Delta(n)$ serves the purpose of abating the effect of bad results of certain periods on the results of interpolating of subsequent periods as much as possible through processing the differences between CQI_report and the estimated CQI of several CQI periods.

According to one embodiment of the present invention, $$\Delta'(n)=sqrt\{(1-b)[\Delta^2(n)+b^2\Delta^2(n-1)+b^3\Delta^2(n-2)+ \ldots ]\}$$

wherein sqrt represents extraction of square root on $\{(1-b) [\Delta^2(n)+b^2\Delta^2(n-1)+b^3\Delta^2(n-2)+ \ldots ]\}$, and b can be any value between 0 and 1.

Of course, those skilled in the art should understand that the above weight processing on $\Delta(n)$ is merely exemplary, and other embodiments can be employed to perform weight processing on $\Delta(n)$.

After the weight processing on $\Delta(n)$, the flow goes to step 34. In step 34, said processing means 22 maps $\Delta'(n)$ to obtain a confidence parameter a (n).

Theoretically, to enable the inner loop power control to keep track of the changes of channel power in a fade environment, suppose the duration of one frame is 10 ms, each frame has 15 time slots each containing the TPC information and being capable of performing power control once, then the maximum range of channel power changes within one frame should not exceed:

$$Max\_Power\_Change=\pm Power\_Control\_stepsize \times 1500 \times 10 \times 10^{-3}$$

wherein Power_Control_stepsize represents the power control step size determined by RNC. When Power_Control_stepsize=0.5 dB, according to above equation, then the maximum range of power changes the inner loop power control can keep track is 7.5 dB.

If the TPC information is no longer correlated with channel changes because of interference, speedy movement of a user, soft handoff and other factors, then the inner loop power control process cannot correctly keep track of changes of channel power, and the error between them may possibly reach 7.5 dB (when the adjustment direction the power control requests is totally opposite to the actual change direction of channel, it may amount to 15 dB theoretically).

According to one embodiment of the present invention, the period of CQI is five HSDPA TTIs, i.e. 10 ms, the adjustment range B of the inner loop power control equals 7.5 dB, and mapping with respect to Δ'(n) is:

When $|Δ'(n)|<7.5$, $λ(n)=|Δ'(n)|/7.5$;
When $|'(n)|≧7.5$, $λ(n)=1.0$.

And the relationship between λ(n) and the confidence parameter a (n) is: a (n)=1−λ(n).

Of course, those skilled in the art should understand that the above embodiment of mapping Δ'(n) is merely exemplary. The period of CQI may be either less or more than 10 ms, and the adjustment range B of the inner loop power control is determined by the CQI period and the power control step size Power_Control_stepsize notified by RNC during link establishing. Mapping between Δ'(n) and λ(n) can be implemented by other embodiments.

After mapping, the flow goes to step 35, in which CQI is interpolated.

According to one embodiment of the present invention, CQI is interpolated in accordance with the following formula:

$$CQI\_interpolated(n,m)=CQI\_report(n)+a(n)\times Power\_Control\_stepsize\times TPC\_Count(n,m).$$

Wherein, CQI_interpolated (n,m) represents the channel quality obtained after interpolating at the mth TTI within the nth period, CQI_report (n) represents the channel quality of the nth period reported by a user equipment, a (n) represents the confidence parameter of the nth period, Power_Control_stepsize represents the power control step size reported by RNC to node B, and TPC_Count(n,m) represents the accumulating of all the TPC information starting from the first TTI to the mth TTI during the nth channel quality reporting period.

a (n)=1 represents that the TPC information can track changes of the CQI reliably, and then the CQI can directly be modified using the power change value of the downlink dedicated channel; a (n)=0 represents that the TPC is completely irrelevant to the changes of the CQI, and then interpolating should be stopped, it should directly use the reported CQI; when a (n) is between 0 and 1, it represents that the TPC is correlated with the changes of CQI in a way.

According to this embodiment, the computation of Δ(n) is performed once per CQI period, n represents the nth period of CQI; interpolation is performed once per TTI, m represents the number of TTIs during one CQI period; and accumulation of TPC is performed once per time slot.

Of course, those skilled in the art should appreciate that the above embodiments of interpolating are merely exemplary, and other embodiments can be employed to perform CQI interpolating.

Various changes and alternations can be made without departing from the concept and scope of the present invention. It should be understood that the present invention is not limited to the specific embodiments, and the scope thereof is defined by the claims as appended.

What is claimed is:

1. A method of interpolating channel quality in a wireless communication system, said wireless communication system comprising a node B and a user equipment, said user equipment periodically reporting the channel quality to said node B, said method comprising the steps of:

estimating, by said node B, the channel quality of the current period based on the channel quality of the preceding period reported by said user equipment;

after estimating the channel quality of the current period reported by said user equipment, computing, by said node B, the difference between the estimated channel quality of the current period and the channel quality of the current period reported by said user equipment;

performing weight processing on said difference; and obtaining, by said node B, a confidence parameter according to said difference, and interpolating the channel quality reported by said user equipment based on said confidence parameter.

2. The method as claimed in claim 1, wherein said node B estimates the channel quality of the current period and interpolates the channel quality reported by said user equipment using fast power control information uploaded on an uplink dedicated control channel.

3. The method as claimed in claim 2, wherein said wireless communication system further comprises a radio network controller (RNC), said RNC determining the period for reporting the channel quality and notifying the period to said node B and said user equipment.

4. The method as claimed in claim 3, wherein said RNC further notifying a power control step size to said node B.

5. The method as claimed in claim 4, wherein said channel quality reporting period includes multiple transmission time intervals.

6. A method of interpolating channel quality in a wireless communication system, said wireless communication system comprising a node B and a user equipment, said user equipment periodically reporting the channel quality to said node B, said method comprising the steps of:

estimating, by said node B, the channel quality of a current period based on the channel quality of a preceding period reported by said user equipment;

after estimating the channel quality of the current period reported by said user equipment, computing, by said node B, the difference between the estimated channel quality of the current period and the channel quality of the current period reported by said user equipment; and obtaining, by said node B, a confidence parameter according to said difference, and interpolating the channel quality reported by said user equipment based on said confidence parameter, wherein said node B estimates the channel quality of the current period and interpolates the channel quality reported by said user equipment using fast power control information uploaded on an uplink dedicated control channel, said wireless communication system further comprises a radio network controller (RNC), said RNC determining the period for reporting the channel quality and notifying the period to said node B and to said user equipment;

said RNC further notifying a power control step size to said node B, and said node B estimates the channel quality of the current period according to the following formula:

$$CQI'(n)=CQI\_report(n-1)+Power\_Control\_stepsize\times TPC\_Count(n-1)$$

wherein CQI'(n) represents the estimated channel quality of the nth period, CQI_report(n−1) represents the channel quality of the (n−1)th period reported by the user equipment, Power_Control_stepsize represents the power control step size notified by said RNC to said node B, and TPC_Count(n−1) represents the accumulation of all the fast power control information reported by the user equipment during the (n−1)th channel quality reporting period.

7. A method of interpolating channel quality in a wireless communication system, said wireless communication system comprising a node B and a user equipment, said user equipment periodically reporting the channel quality to said node B, said method comprising the steps of:

estimating, by said node B, the channel quality of a current period based on the channel quality of a preceding period reported by said user equipment, after estimating the channel quality of the current period reported by said user equipment, computing, by said node B, the difference between the estimated channel quality of the current period and the channel quality of the current period reported by said user equipment; and obtaining, by said node B, a confidence parameter according to said difference, and interpolating the channel quality reported by said user equipment based on said confidence parameter, wherein said node B estimates the channel quality of the current period and interpolates the channel quality reported by said user equipment using fast power control information uploaded on an uplink dedicated control channel, said wireless communication system further comprises a radio network controller (RNC), said RNC determining the period for reporting the channel quality and notifying the period to said node B and to said user equipment, said period for reporting the channel quality including multiple transmission time intervals;

said RNC further notifying a power control step size to said node B, and said node B interpolates the channel quality according to the following formula:

$$CQI\_interpolated(n,m) = CQI_{13}\_report(n) + a(n) \times Power\_Control\_stepsize \times TPC\_Count(n,m),$$

wherein, CQI_interpolated(n,m) represents the channel quality obtained after interpolating at the mth transmission time interval within the nth period, CQI_report(n) represents the channel quality of the nth period reported by the user equipment, a(n) represents the confidence parameter of the nth period, Power_Control_stepsize represents the power control step size reported by said RNC to said node B, and TPC_Count(n,m) represents the accumulation of all the fast power control information starting from the first transmission time interval to the mth transmission time interval during the nth channel quality reporting period.

* * * * *